United States Patent
Dudar et al.

(10) Patent No.: US 11,530,658 B1
(45) Date of Patent: Dec. 20, 2022

(54) SYSTEMS AND METHODS FOR VEHICLE FUEL TANK REFUELING

(71) Applicant: Ford Global Technologies, LLC, Dearborn, MI (US)

(72) Inventors: Aed Dudar, Canton, MI (US); Chito Miranda Dancel, Rochester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 17/449,929

(22) Filed: Oct. 4, 2021

(51) Int. Cl.
| | |
|---|---|
| F02D 41/00 | (2006.01) |
| F02M 25/08 | (2006.01) |
| B01D 53/04 | (2006.01) |
| B67D 7/04 | (2010.01) |

(52) U.S. Cl.
CPC ....... F02D 41/004 (2013.01); B01D 53/0446 (2013.01); F02M 25/0836 (2013.01); *B01D 2253/102* (2013.01); *B01D 2257/702* (2013.01); *B01D 2259/4516* (2013.01); *B01D 2259/4566* (2013.01); *B67D 7/04* (2013.01); *F02D 2200/0606* (2013.01); *F02D 2200/0614* (2013.01)

(58) Field of Classification Search
CPC ........... F02D 41/004; F02D 2200/0606; F02D 2200/0614; F02M 25/0836; B01D 53/0446; B01D 2253/102; B01D 2257/702; B01D 2259/4516; B01D 2259/4566; B67D 7/04
See application file for complete search history.

(56) References Cited

U.S. PATENT DOCUMENTS

| | | | |
|---|---|---|---|
| 9,664,127 B2 | 5/2017 | Dudar | |
| 9,829,370 B2 | 11/2017 | Dudar et al. | |
| 1,048,043 A1 | 11/2019 | Dudar | |
| 10,767,599 B2 | 9/2020 | Dudar et al. | |
| 10,915,104 B2 | 2/2021 | Dudar | |
| 2015/0276457 A1* | 10/2015 | Dudar | G01F 23/18 73/290 R |
| 2015/0285171 A1* | 10/2015 | Dudar | F02M 25/0836 73/114.39 |
| 2020/0070649 A1* | 3/2020 | Dudar | B60K 15/03504 |
| 2020/0141339 A1* | 5/2020 | Dudar | B60K 15/03504 |
| 2020/0290861 A1* | 9/2020 | Dudar | B60K 15/03519 |

* cited by examiner

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are provided for vehicle fuel tanks including multiple reservoirs. In one example, a method may include opening a canister purge valve of a fuel system responsive to a fuel level of a fuel tank transitioning above a first threshold fuel level, and closing the canister purge valve after flowing a pre-determined amount of fuel to the fuel tank while the canister purge valve is open.

19 Claims, 5 Drawing Sheets

SYSTEMS AND METHODS FOR VEHICLE FUEL TANK REFUELING

FIELD

The present description relates generally to methods and systems for vehicle fuel tanks, and in particular, to vehicle fuel tanks including multiple reservoirs.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

The fuel tank is typically sealed with a fuel tank isolation valve (FTIV). Prior to refueling, fuel vapors in the tank may be vented to the fuel vapor canister by opening the FTIV. During the refueling event, the FTIV is maintained open, so that fuel vapor generated during refueling can be shunted to the canister. Air stripped of fuel vapor is directed to atmosphere via a canister vent line.

However, the inventors herein have recognized potential issues with such systems. As one example, during a refueling event of a fuel tank, fuel may first fill a first reservoir of the fuel tank and then flow to a second reservoir of the fuel tank. As the fuel flows to the second reservoir, a pressure spike within the fuel tank may occur. During conditions in which a magnitude of the pressure spike is sufficiently high, pre-mature shutoff of a fuel nozzle flowing fuel to the fuel tank may occur, which may interrupt the refueling event and increase a refueling time of the fuel tank.

In one example, the issues described above may be addressed by a method for a fuel system, comprising: during a refueling event: opening a canister purge valve fluidly coupling a fuel vapor canister to an intake of an engine responsive to a fuel level of a fuel tank transitioning above a first threshold fuel level; and closing the canister purge valve after flowing a pre-determined amount of fuel to the fuel tank while the canister purge valve is open. In this way, fuel vapor within the fuel tank may flow to the engine and reduce a magnitude of pressure spikes within the fuel tank, which may reduce a likelihood of premature termination of the refueling event.

As one example, the first threshold fuel level may correspond to a level of fuel slightly less than a fuel capacity of a first reservoir of the fuel tank. As the level of fuel within the first reservoir transitions above the first threshold fuel level, the canister purge valve is opened and vapor pressure within the fuel tank may be reduced. As the fuel fills the first reservoir and begins to flow to the second reservoir, fuel vapor resulting from the flow of fuel to the second reservoir flows out of the fuel tank through the canister purge valve. As a result, a likelihood of pressure spikes within the fuel tank during the refueling event may be reduced, which may reduce a likelihood of premature shutoff of fuel delivery to the fuel tank, decrease refueling time, and increase an ease of use of the fuel system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 is shown approximately to scale, although other relative dimensions may be used, if desired.

DETAILED DESCRIPTION

Figure 3:
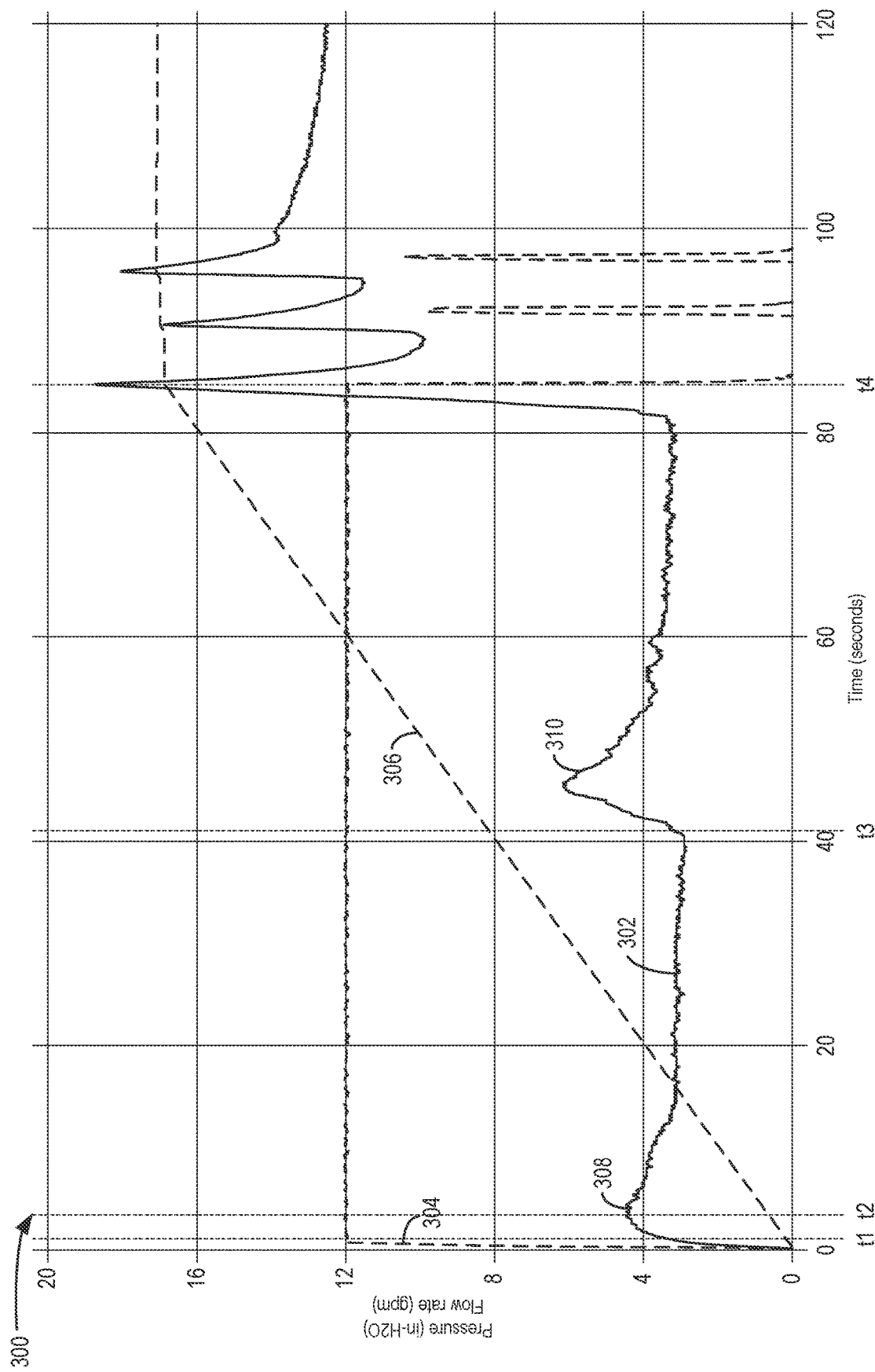
FIG. 3 shows a first graph including plots showing fuel tank parameters during a refueling event of the fuel tank.
Figure 4:
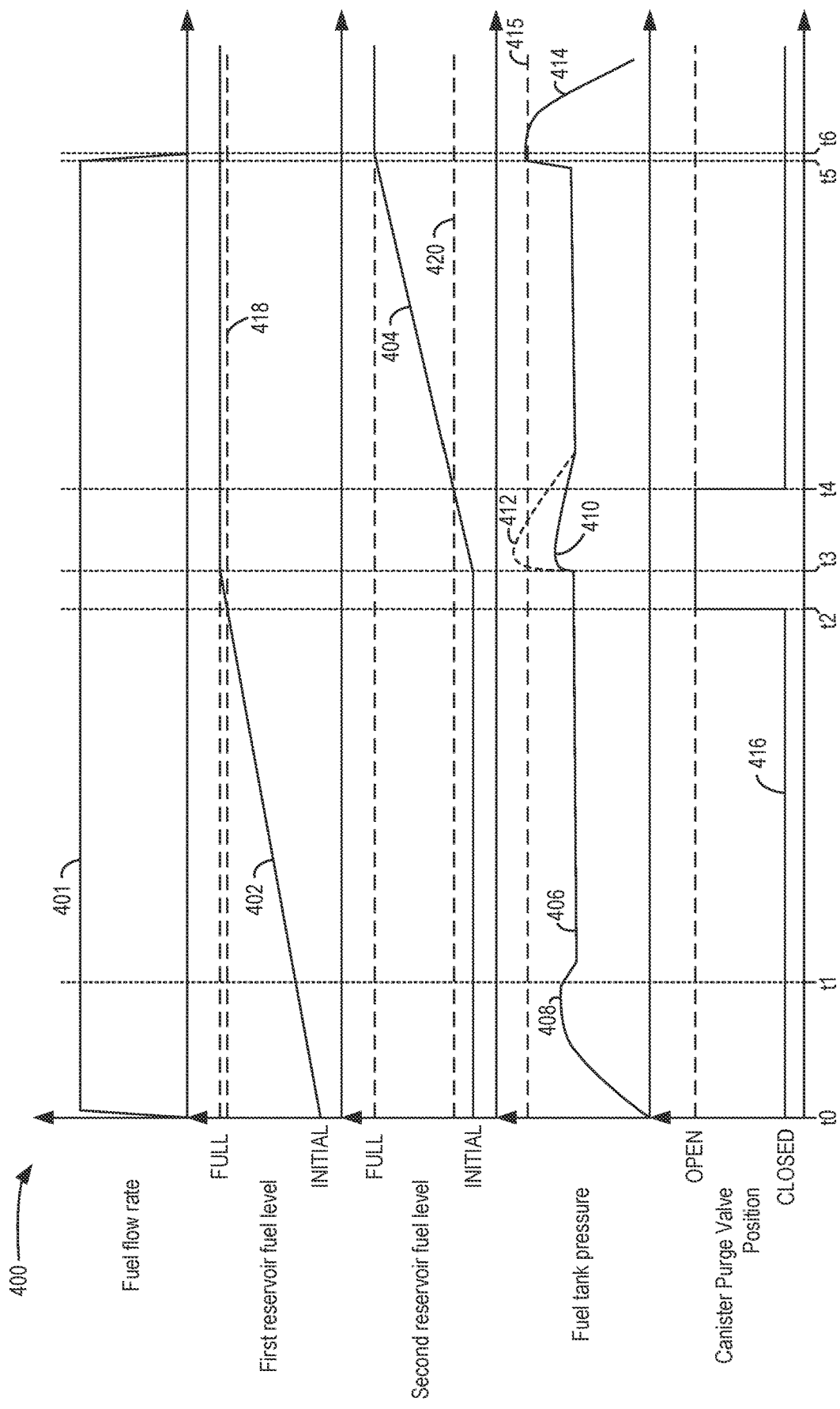
FIG. 4 shows a second graph including plots showing fuel tank parameters during a refueling event of the fuel tank.
Figure 5:
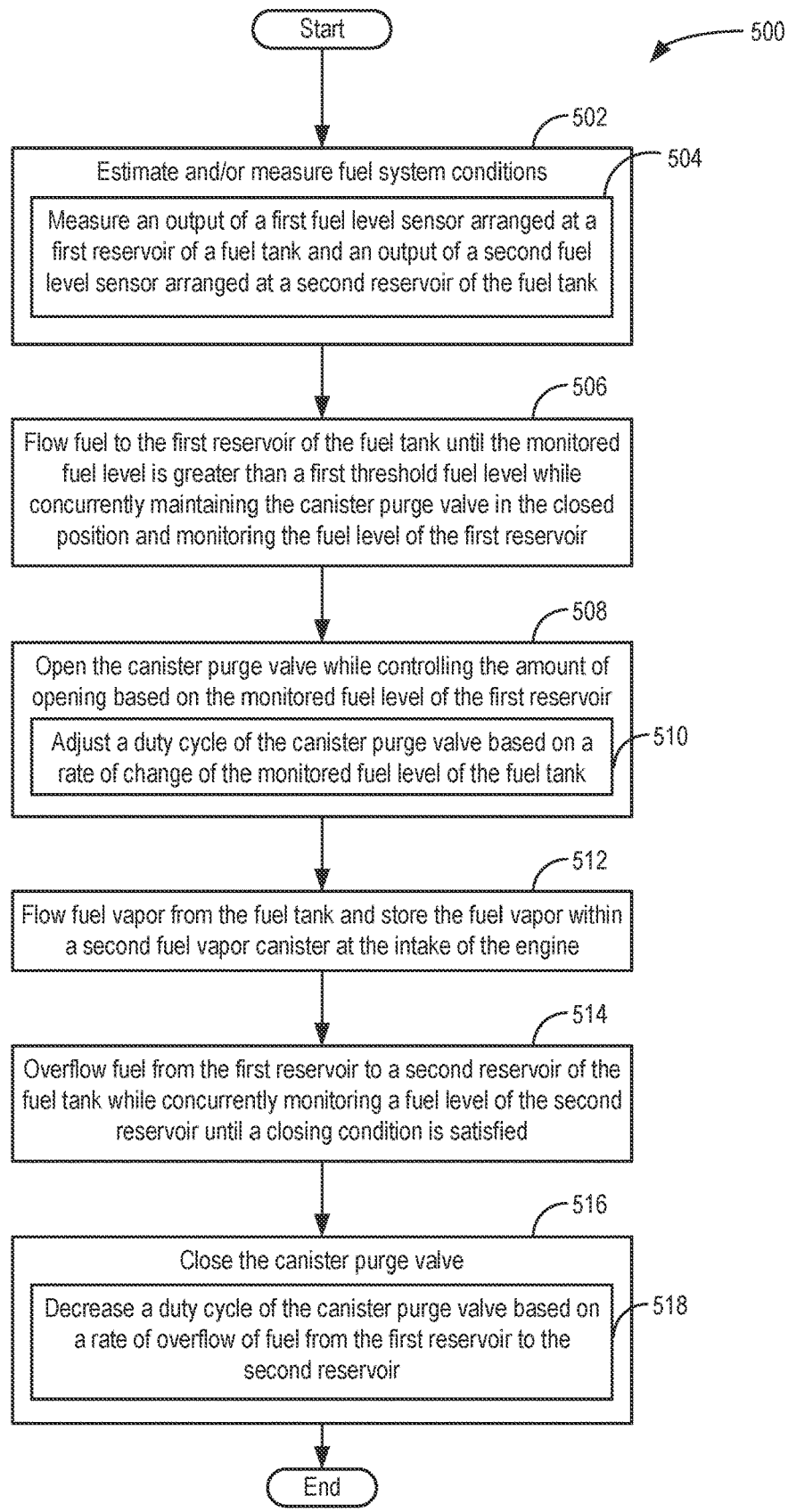
FIG. 5 shows a flowchart illustrating a method for controlling fuel vapor flow during a refueling event of a fuel tank.

The following description relates to systems and methods for vehicle fuel tanks including multiple reservoirs. A fuel system, such as the fuel system shown by FIG. 1, includes a fuel tank having a first reservoir and a second reservoir, such as the fuel tank shown by FIG. 2. During a refueling event of the fuel tank, fuel is provided directly to the first reservoir via a fuel delivery device such as a fuel nozzle. A pressure of fuel vapor within the fuel tank may vary as fuel flows to the fuel tank and may result in one or more fuel vapor pressure spikes, as shown by FIG. 3. In order to reduce a likelihood of premature shutoff of the fuel delivery device due to the fuel vapor pressure spikes, the level of fuel within the fuel tank is monitored and a canister purge valve of the fuel system is maintained in a fully closed position until the fuel level within the first reservoir transitions above a first threshold fuel level. When the fuel level transitions above the first threshold fuel level, the canister purge valve is opened to provide a low-pressure flow path of fuel vapor from the fuel tank to the engine. As the fuel level within the first reservoir reaches the fuel capacity of the first reservoir and fuel overflows from the first reservoir to the second reservoir, the flow of fuel vapor through the canister purge valve reduces a magnitude of fuel vapor pressure spikes within the fuel tank, as shown by FIG. 4. The canister purge valve may be maintained in the opened position until a closing condition has been satisfied, as shown by FIG. 5. As a result, a likelihood of premature termination of the refueling event may be reduced, an overall duration of the refueling of the fuel tank may be reduced, and an ease of use of the fuel system may be increased.

Figure 1:
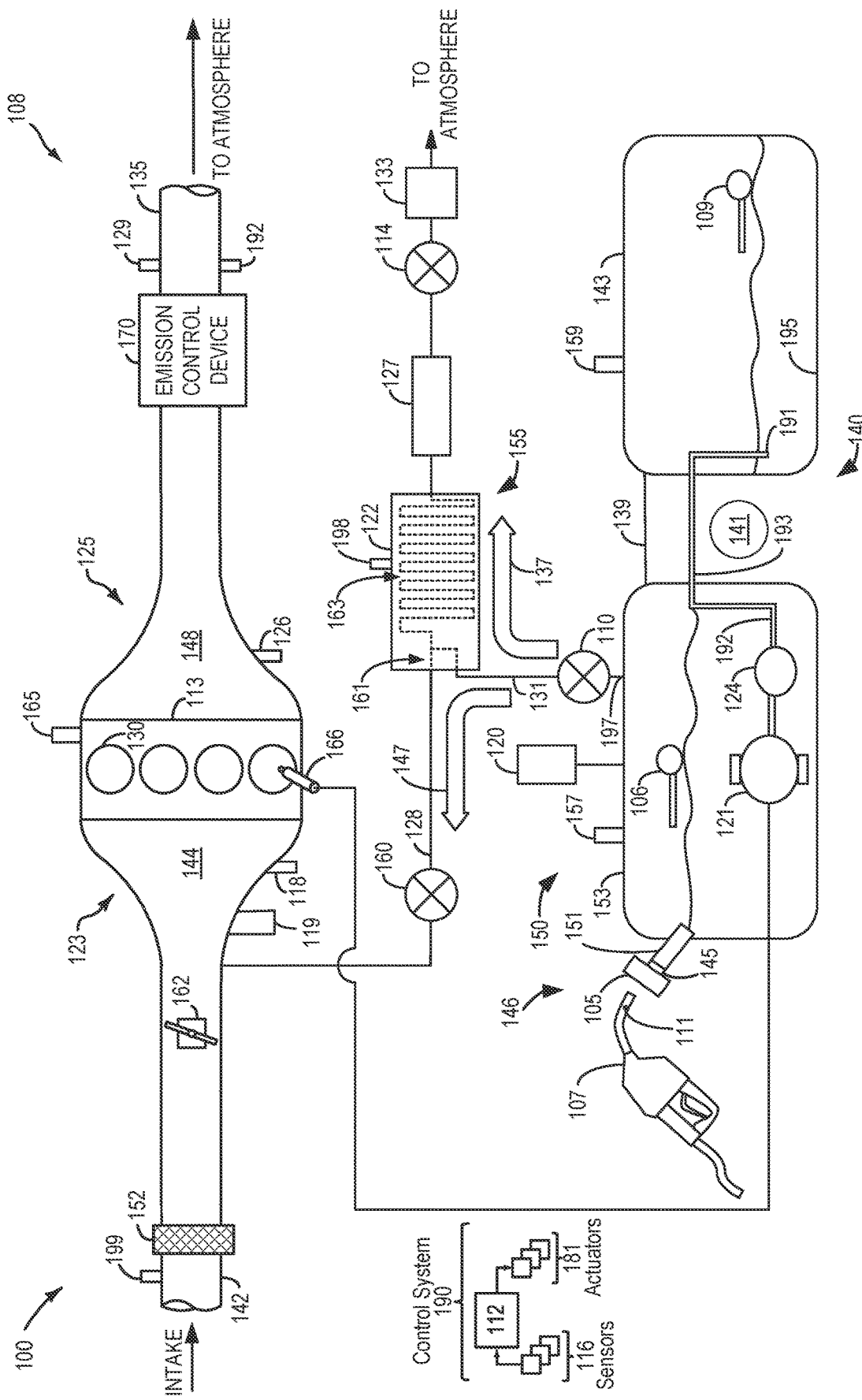
FIG. 1 schematically shows a vehicle fuel system including a fuel tank with multiple reservoirs.

Referring to FIG. 1, a schematic depiction of a vehicle system 100 that can derive propulsion power from engine system 108 is shown. Vehicle system 100 may be a conventional vehicle powered solely through combustion, or it may be a hybrid vehicle system that can derive propulsion power from engine system 108 and/or an on-board energy storage device, such as a battery system. An energy conversion device, such as a generator, may be operated to absorb energy from vehicle motion and/or engine operation, and then convert the absorbed energy to an energy form suitable for storage by the energy storage device.

Engine system 108 includes engine 113 having a plurality of cylinders 130. Engine 113 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Engine system 108 is coupled to fuel system 140 and evaporative emissions system 155. Fuel system 140 includes a fuel tank 150 coupled to a fuel pump 121 and evaporative emissions system 155 includes a fuel vapor canister 122. During a fuel tank refueling event, fuel may be pumped into the vehicle from an external source through fuel inlet 151 (which may be referred to herein as a refueling port) that is part of a refueling system 146. Fuel tank 150 may hold a plurality of fuel blends, including fuel with a range of alcohol concentrations, such as various gasoline-ethanol blends, including E10, E85, gasoline, etc., and combinations thereof.

Further, refueling system 146 may include refueling lock 145. In some embodiments, refueling lock 145 may be a fuel cap locking mechanism. The fuel cap locking mechanism may be configured to automatically lock the fuel cap in a closed position so that the fuel cap cannot be opened. For example, the fuel cap 105 may remain locked via refueling lock 145 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 145 may be a filler pipe valve. In such embodiments, refueling lock 145 may not prevent the removal of fuel cap 105. Rather, refueling lock 145 may prevent the insertion of a refueling pump into fuel inlet 151. In such an example, the refueling lock may be electrically locked, for example by a solenoid, or mechanically locked, for example by a pressure diaphragm.

In some embodiments, refueling lock 145 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 145 is locked using an electrical mechanism, refueling lock 145 may be unlocked by commands from controller 112, for example, when a fuel tank pressure decreases below a pressure threshold. In embodiments where refueling lock 145 is locked using a mechanical mechanism, refueling lock 145 may be unlocked via a pressure gradient, for example, when a fuel tank pressure decreases to atmospheric pressure.

Fuel tank 150 is configured as a bifurcated fuel tank, or a fuel tank with two or more separate reservoirs, wherein each reservoir is fluidically coupled to at least one other reservoir via a conduit. In this example, second reservoir 143 is shown coupled to first reservoir 153. Discussed herein, second reservoir 143 may be referred to as a passive reservoir and/or passive side of the fuel tank 150, and first reservoir 153 may be referred to as an active reservoir and/or active side of the fuel tank 150. First reservoir 153 and second reservoir 143 together may be considered a single, saddle fuel tank, which may be configured to be placed over the engine driveline 141 (which may be referred to herein as a driveshaft). In this configuration, the fuel tank 150 may fit around the engine driveline 141 via the first reservoir 153 and second reservoir 143 arranged at opposing sides of the engine driveline 141, which may increase a fuel capacity of the fuel tank 150 relative to fuel tanks that do not include multiple reservoirs. Second reservoir 143 may hold additional fuel that is metered to first reservoir 153 via a jet pump 124. Jet pump 124 may transfer fuel from second reservoir 143 to first reservoir 153, based on a signal received from controller 112, for example. As one example, the controller 112 may sense (e.g., monitor) a fuel level within the first reservoir 153 and a fuel level within the second reservoir 143 and may control the jet pump 124 to flow fuel from the second reservoir 143 to the first reservoir 153 during conditions in which the fuel level within the first reservoir 153 is below a threshold (e.g., 50% of a fuel capacity of the first reservoir 153, 30% of the fuel capacity of the first reservoir 153, etc.). In some examples, jet pump 124 may be configured to constantly (e.g., continuously, without interruption) replenish fuel withdrawn from first reservoir 153 by fuel pump 121 during conditions in which the engine is in operation (e.g., the engine is on and combusting a mixture of fuel and air within cylinders of the engine). Jet pump 124 may transfer fuel between second reservoir 143 and first reservoir 153 via a conduit or hose 193 coupled to jet pump 124. Jet pump 124 may have an inlet 191 positioned in second reservoir 143 and an outlet 192 positioned in first reservoir 153. A check valve may be included in conduit 193 of jet pump 124, to enable fuel to be drawn from second reservoir 143 into first reservoir 153 when jet pump 124 is activated, but which prevents fuel and/or fuel vapors from traveling from first reservoir 153 to second reservoir 143 when jet pump 124 is off. Further, in some embodiments, jet pump 124 and fuel pump 121 may be combined into a single pump unit.

A first fuel level sensor 106 located in first reservoir 153 may provide an indication of the fuel level ("Fuel Level Input") of the first reservoir 153 to controller 112. As depicted, first fuel level sensor 106 may comprise a float connected to a variable resistor. Alternatively, other types of fuel level sensors may be used.

A conduit 139 may couple first reservoir 153 to second reservoir 143 to allow vapors and in some examples fuel to flow between first reservoir 153 and second reservoir 143. In some examples, jet pump 124 may transfer fuel between first reservoir 153 and second reservoir 143 via a hose or conduit passing through conduit 139. Fuel may flow from first reservoir 153 into second reservoir 143, or vice-versa. In some examples, during refueling, upon first reservoir 153 reaching full capacity, fuel may flow from first reservoir 153 into second reservoir 143 via conduit 139. The flow of fuel from first reservoir 153 into second reservoir 143 as a result of fuel being dispensed into the first reservoir 153 during conditions in which the fuel level within the first reservoir 153 is equal to a full fuel capacity of the first reservoir 153 may be referred to herein as overflow of fuel from the first reservoir 153 to the second reservoir 143. In some examples, jet pump 124 may mediate fuel transfer between first reservoir 153 and second reservoir during refueling events. A second fuel level sensor 109 located in second reservoir 143 may provide an indication of the fuel level ("Fuel Level Input") in second reservoir 143 to controller 112. As depicted, second fuel level sensor 109 may comprise a float connected to a variable resistor. Alternatively, other types of fuel level sensors may be used. Further, vehicle system 100 may include an overall fuel level indicator (not shown) that indicates an average of an output of first fuel level sensor 106 and second fuel level sensor 109. In other examples, the controller 112 may estimate and/or measure (e.g., calculate) the overall fuel level as an average of the fuel level of the first reservoir 153, as indicated by the output of the first fuel level sensor 106, and the fuel level of the second reservoir 143, as indicated by the output of the second fuel level sensor 109.

Fuel pump 121 is configured to pressurize fuel delivered to the injectors of engine 113, such as example fuel injector 166. While only a single fuel injector 166 is shown, additional injectors are provided for each cylinder. It will be appreciated that fuel system 140 may be a return-less fuel system, a return fuel system, or various other types of fuel system. Vapors generated in fuel tank 150 and/or 140 may be routed to fuel vapor canister 122, via load conduit 131, before being purged to the engine intake 123 (e.g., by adjusting an amount of opening of canister purge valve 160).

Fuel vapor canister 122 may be filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 122 may be purged to engine intake 123 via purge line 128 by opening canister purge valve 160. During conditions in which the engine is not operating (e.g., the engine is off and a mixture of fuel and air is not being combusted within engine cylinders), fuel vapors flowing through canister purge valve 160 may be stored in a second fuel vapor canister 119 arranged at the engine intake 123. The fuel vapors stored in the second fuel vapor canister 119 may then be ignited within the engine cylinders during the next engine-on event. One or more temperature sensors 198 may be coupled to and/or within canister 122. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and canister load may be estimated based on temperature changes within the canister.

Canister 122 includes a vent 127 (which may be referred to herein as a bleed element) for routing gases out of the canister 122 to the atmosphere when storing, or trapping, fuel vapors from fuel tank 150. Vent 127 may also allow fresh air to be drawn into fuel vapor canister 122 when purging stored fuel vapors to engine intake 123 via purge line 128 and canister purge valve 160. While this example shows vent 127 communicating with fresh, unheated air, various modifications may also be used. Vent 127 may include a canister vent valve 114 to adjust a flow of air and vapors between canister 122 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister.

If vehicle system 100 is a hybrid vehicle, it may have reduced engine operation times due to the vehicle being powered by engine system 108 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve (FTIV) 110 may be optionally included in load conduit 131 such that a fuel vapor outlet 197 of the fuel tank 150 is fluidly coupled to canister 122 via the fuel tank isolation valve 110. Under certain conditions, fuel tank isolation valve 110 may be kept closed to limit the amount of diurnal or "running loss" vapors directed to canister 122 from fuel tank 150. During other conditions, such as a refueling event, fuel tank isolation valve 110 may be commanded open. As an example, during refueling operations, and selected purging conditions, fuel tank isolation valve 110 may be maintained opened, e.g., for a duration, to direct fuel vapors from the fuel tank 150 to canister 122. It may be understood that fuel tank isolation valve 110 may comprise a latchable valve. For example, fuel tank isolation valve 110 may latch open and/or latch closed. In this configuration, an amount of battery power used to actuate fuel tank isolation valve 110 may be reduced.

Pressure sensor 120 may be optionally coupled to fuel system 140 for providing an estimate and/or measurement of a fuel system pressure (e.g., a pressure of fuel vapor within the fuel tank 150). In one example, the fuel system pressure is a fuel tank pressure, wherein pressure sensor 120 is a fuel tank pressure transducer (FTPT) coupled to first reservoir 153 for estimating a fuel tank pressure or vacuum level. In some examples, a second pressure sensor (not shown) may be coupled to second reservoir 143 for estimating a fuel tank pressure or vacuum level. However, in some examples, the fuel system 140 may not include pressure sensors configured to sense the fuel tank pressure.

Fuel vapors released from canister 122, for example during a purging operation, may be directed into engine intake manifold 144 via purge line 128. The flow of vapors along purge line 128 may be regulated by canister purge valve (CPV) 160, coupled between the fuel vapor canister 122 and the engine intake (e.g., intake manifold 144). The quantity and rate of vapors released by CPV 160 may be determined by the duty cycle of an associated CPV solenoid (not shown). As such, the duty cycle of the CPV solenoid may be determined by the vehicle's powertrain control module (PCM), such as controller 112, responsive to engine operating conditions while a refueling event is not occurring, including, for example, engine speed-load conditions, an air-fuel ratio, a canister load, etc. By commanding CPV 160 to be closed, the controller may seal the fuel vapor recovery system from the engine intake. An optional canister check valve (not shown) may be included in purge line 128 to prevent intake manifold pressure from flowing gases in the opposite direction of the purge flow. An estimate of the manifold absolute pressure (MAP) or manifold vacuum (ManVac) may be obtained from MAP sensor 118 coupled to intake manifold 144 and communicated with controller 112. Alternatively, MAP may be inferred from alternate engine operating conditions, such as mass air flow (MAF), as measured by a MAF sensor (not shown) coupled to the intake manifold.

The fuel system may be operated in a refueling mode during a refueling event (e.g., when fuel tank refueling is requested by a vehicle operator), wherein the controller 112 may open fuel tank isolation valve 110 to depressurize the fuel tank 150 before fuel is added to the fuel tank 150. As such, fuel tank isolation valve 110 may be kept open during the refueling operation to allow refueling vapors to flow to the fuel vapor canister 122. After refueling is completed, fuel tank isolation valve 110 may be closed.

Returning to the discussion on operating modes of the fuel system, as yet another example, the fuel system may be operated in a canister purging mode (e.g., after an emission control device light-off temperature has been attained and with the engine running), wherein the controller 112 may open CPV 160 while closing fuel tank isolation valve 110 while the engine is operating. Herein, the vacuum generated by the intake manifold of the operating engine may be used to draw fresh air through vent 127 and through fuel vapor canister 122 to purge the stored fuel vapors into intake manifold 144. In this mode, the purged fuel vapors from the fuel vapor canister 122 are combusted in the engine 113.

Vehicle system 100 may further include control system 190. Control system 190 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 199, MAP sensor 118, pressure sensor 129, first fuel level sensor 106, second fuel level sensor 109, and fuel tank pressure sensor 120. Other sensors such as additional pressure, temperature, air/fuel ratio, and composition sensors may be coupled to various locations in the vehicle system 100. As another example, the actuators may include fuel injector 166, fuel tank isolation valve 110, canister purge valve 160, vent valve 114, fuel pump 121, jet pump 124, and throttle 162. The control system 190 further includes controller 112. The controller may receive input data from the various sensors, process the input data, and trigger the actuators in response to the processed input data based on instruction or code programmed therein corresponding to one or more routines. For example, controller 112 receives signals from the various sensors of FIG. 1 and employs the various actuators of FIG. 1 to adjust engine operation based on the received signals and instructions stored on a memory of the controller. For example, adjusting a flow rate of fuel vapor from the fuel tank 150 to the engine 113 may include adjusting an actuator of the canister purge valve 160 to adjust an amount of opening of the canister purge valve 160, where the flow rate of fuel vapor from the fuel tank 150 is based on the amount of opening of the canister purge valve 160. Example control routines are described herein with regard to FIG. 5.

Fuel delivery devices such as fuel nozzle 107 typically include a sensor or other device configured to shut off the fuel delivery device (e.g., stop a flow of fuel from the fuel delivery device) responsive to a sensed pressure of the fuel tank 150. For example, the fuel nozzle 107 (which may be referred to herein as a fuel delivery device) may include a pressure sensor 111 configured to shut off the fuel nozzle 107 responsive to a pressure of fuel vapor within the fuel tank 150 being greater than a threshold pressure in order to reduce a likelihood of overfilling of the fuel tank 150, where the threshold pressure is a pressure of fuel vapor within the fuel tank during conditions in which the fuel tank 150 is at full fuel capacity. During some conditions, such as a refueling event in which fuel is dispensed to the fuel tank 150 (e.g., via a fuel delivery device, such as fuel nozzle 107), fuel vapor may flow from the fuel tank 150 to canister 122 while the canister vent valve 114 is in an opened position. For example, during the refueling event, the controller 112 may maintain the canister vent valve 114 in the opened position until the controller 112 determines that the level of fuel within the fuel tank 150 is approximately equal to a fuel capacity of the fuel tank 150. The controller 112 may then adjust the canister vent valve 114 to the fully closed position, resulting in the fuel vapor pressure within the fuel tank 150 increasing above the threshold pressure. The pressure sensor 111 of the fuel nozzle 107 may sense the increased fuel vapor pressure and may shutoff fuel flow from the fuel nozzle 107 to the fuel tank 150. The pressure sensor 111 may automatically (e.g., without being commanded) close the fuel nozzle 107 responsive to the sensed pressure of the fuel tank 150 being greater than the threshold pressure in order to stop the flow of fuel from the fuel nozzle 107.

The canister 122 may strip the fuel from the fuel vapor and the remaining air may flow out of the canister 122 to atmosphere, as indicated by first flow direction arrow 137. Air flowing out of the canister 122 may flow through additional components prior to flowing to atmosphere, such as vent 127, dust box 133, etc. The fuel vapor may be forced along a tortuous flow path through the canister 122 in order to provide sufficient extraction of fuel from the fuel vapor by canister 122. An example tortuous flow path 163 is indicated schematically in FIG. 1. Further, the canister 122 may include a plurality of baffles or other features configured to slow the flow of fuel vapor through the canister 122 in order to increase the amount of fuel extracted from the fuel vapor by the canister 122. Additionally, the components downstream of the canister 122 may further slow the flow of fuel vapor through the canister 122 by increasing a pressure of air downstream of the canister 122. As a result, during a refueling event of the fuel tank 150, a rate of fuel vapor flow through the canister 122 to atmosphere via opening of the canister vent valve 114 may be insufficient to prevent pressure spikes from occurring within the fuel tank 150, which may result in premature shutoff of the fuel delivery device (e.g., fuel nozzle 107).

According to the present disclosure, in order to increase a flow of fuel vapor from the fuel tank 150 during a refueling event and reduce a likelihood of pressure spikes within the fuel tank 150 that may cause premature shutoff of the fuel delivery device (e.g., fuel nozzle 107), the controller 112 controls the amount of opening of canister purge valve 160 during the refueling event based on fuel tank conditions. For example, during conditions in which the controller 112 determines that the level of fuel within the first reservoir 153 transitions above a first threshold fuel level, the controller 112 opens the canister purge valve 160 in order to flow fuel vapor from the fuel tank 150 to the engine 113 (e.g., as indicated by second flow direction arrow 147). The flow rate of fuel vapor in the direction indicated by second flow direction arrow 147 may be greater than the flow rate of fuel vapor in the direction indicated by first flow direction arrow 137 due to a relatively low backpressure of the intake manifold 144 compared to a backpressure of the fuel vapor canister 122 (e.g., due to the tortuous flow path, baffle, and/or other components along the fuel vapor flow path through the fuel vapor canister 122 to atmosphere as described above). An example flow path 161 of fuel vapor through the canister 122 to the engine 113 is shown by FIG. 1, where the flow path 161 is relatively straight compared to the tortuous flow path 163. In this configuration, a backpressure against the fuel vapor within the fuel tank 150 along flow path 161 is less than a backpressure against the fuel vapor within the fuel tank 150 along tortuous flow path 163.

By flowing the fuel vapor to the engine 113 via canister purge valve 160, extraction of fuel vapor from the fuel tank 150 is increased relative to flowing the fuel vapor through the fuel vapor canister 122 to atmosphere via the canister vent valve 114. As a result, a likelihood and/or magnitude of pressure spikes within the fuel tank 150 is reduced compared to flowing fuel vapor through the fuel vapor canister 122 to atmosphere via the canister vent valve 114, which may reduce a likelihood of premature termination of the refueling event (e.g., premature shutoff of the fuel delivery device). As described above, pressure spikes may occur in particular during conditions in which fuel begins to overflow from the first reservoir 153 of the fuel tank 150 to the second reservoir 143 of the fuel tank 150. For example, a temperature of the fuel may be much less than a temperature of the fuel tank 150 during conditions in which the engine 113 has been operated for an extended duration. As the fuel overflows from the first reservoir 153 and comes into contact with interior surfaces of the second reservoir 143 (e.g., interior surface 195), the temperature differential between the fuel and the interior surfaces of the second reservoir 143 may cause an increased generation of fuel vapor within the second reservoir 143 and may result in a fuel vapor pressure spike within the second reservoir 143. By commanding the canister purge valve 160 to open prior to the overflow of fuel from the first reservoir 153 to the second reservoir 143 and maintaining the canister purge valve 160 open as the fuel overflows from the first reservoir 153 to the second reservoir 143 and comes into contact with the interior surfaces of the second reservoir 143, a likelihood of a pressure spike and/or a magnitude of a pressure spike within the second reservoir 143 may be decreased. The controller 112 then closes the canister purge valve 160 when the controller 112 determines that a closing condition has occurred. As one example, the closing condition may be a determination that a sufficient amount of fuel has overflowed from the first reservoir 153 to the second reservoir 143 to reduce the temperature differential between the fuel and the interior surfaces of the second reservoir 143. Other examples are described further below with reference to FIG. 5.

As described above, in some examples vehicle system 100 may be a hybrid vehicle system with multiple sources of torque available to one or more vehicle wheels. In other examples, vehicle system 100 may be a conventional vehicle with only engine 113 as a source of torque available to the vehicle wheels. As one example, the vehicle system 100 may include an electric machine (e.g., an electric motor or a motor/generator), and the engine driveline 141 and the electric machine may be connected via a transmission to vehicle wheels when one or more clutches are engaged. A first clutch may be provided between engine driveline 141 and the electric machine, and a second clutch may be provided between the electric machine and the transmission. Controller 112 may send a signal to an actuator of each clutch to engage or disengage the clutch, so as to connect or disconnect engine driveline 141 from the electric machine and the components connected thereto, and/or connect or disconnect the electric machine from the transmission and the components connected thereto. The transmission may be a gearbox, a planetary gear system, or another type of transmission. The powertrain may be configured in various manners including as a parallel, a series, or a series-parallel hybrid vehicle.

The electric machine may receive electrical power from a traction battery to provide torque to the vehicle wheels. The electric machine may also be operated as a generator to provide electrical power to charge the battery, for example, during a braking operation.

Figure 2:
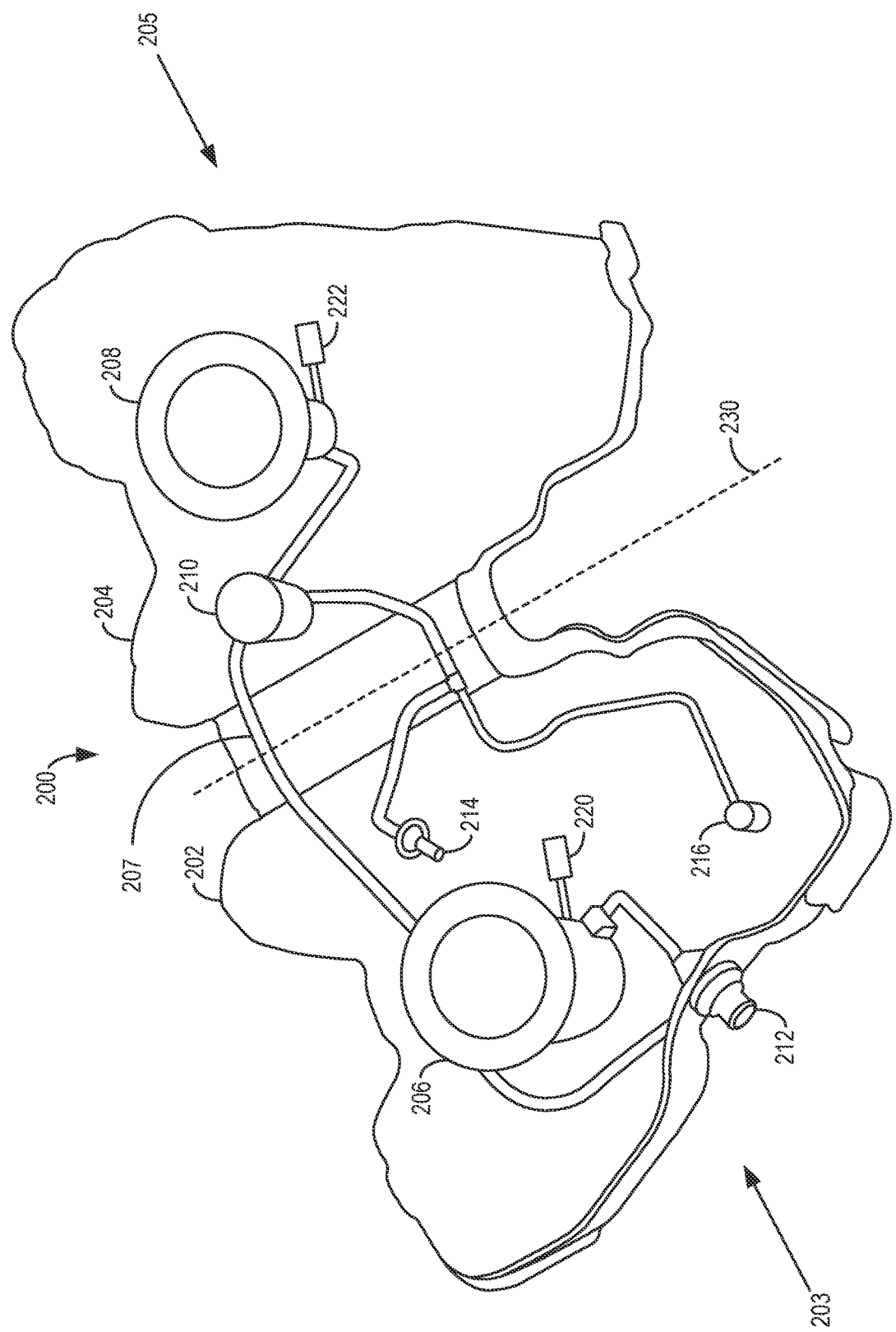
FIG. 2 shows a perspective view of an example fuel tank including multiple reservoirs.

Referring to FIG. 2, a perspective view of a fuel tank 200 including multiple reservoirs is shown. The fuel tank 200 includes a first reservoir 202 arranged at a first side 203 of the fuel tank 200 and a second reservoir 204 arranged at a second side 205 of the fuel tank 200. The first reservoir 202 and the second reservoir 204 are fluidly coupled to each other via a conduit 207. A jet pump 210 may flow fuel from the second reservoir 204 to the first reservoir 202. The first reservoir 202 includes a first fuel delivery module 206 and the second reservoir includes a second fuel delivery module 208. In some examples, the jet pump 210 may be integrated within the second fuel delivery module 208.

A first fuel level sensor 220 arranged (e.g., disposed) within the first reservoir 202 may be coupled to the first fuel delivery module 206 and electronically coupled to a controller (e.g., controller 112 shown by FIG. 1 and described above) via the first fuel delivery module 206. A second fuel level sensor 222 arranged within the second reservoir 204 may be coupled to the second fuel delivery module 208 and electronically coupled to the controller via the second fuel delivery module 208.

A fuel vapor pressure sensor 216 (e.g., pressure transducer) arranged at the first reservoir 202 may be electronically coupled to the controller and configured to provide an indication of fuel vapor pressure to the controller. For example, the fuel vapor pressure sensor 216 may output a signal to the controller indicating the current fuel vapor pressure within the fuel tank 200, with a pulse width of the signal being a function of the measured fuel vapor pressure. The controller may determine the fuel vapor pressure based on the pulse width of the signal output by the fuel vapor pressure sensor 216. As one example, the controller may calculate the fuel vapor pressure based on the signal output by the fuel vapor pressure sensor 216 using a function stored in a memory of the controller, where the pulse width of the output of the fuel vapor pressure sensor 216 is an input of the function and the fuel vapor pressure is an output of the function. As another example, the controller may determine the fuel vapor pressure using a look-up table stored in memory of the controller, with the output pulse width of the fuel vapor pressure sensor 216 being an input and the fuel vapor pressure being an output.

The fuel tank 200 includes a fuel vapor outlet 214 and a fuel inlet 212. The fuel vapor outlet 214 is configured to flow fuel vapor out of the fuel tank 200 (e.g., to a fuel vapor canister, which may be similar to, or the same as, the fuel vapor canister 122 shown by FIG. 1 and described above). The fuel inlet 212 is fluidly coupled to the first reservoir 202 and during a refueling event, fuel dispensed by a fuel delivery device (e.g., fuel nozzle 107 shown by FIG. 1 and described above) flows into the first reservoir 202 via the fuel inlet 212.

In some examples, the fuel tank 200 may be similar to, or the same as, the fuel tank 150 described above with reference to FIG. 1 and several of the components included therein may be similar to, or the same as, the components described above with reference to FIG. 1. For example, the first reservoir 202, second reservoir 204, conduit 207, first fuel level sensor 220, second fuel level sensor 222, fuel vapor pressure sensor 216, fuel vapor outlet 214, and fuel inlet 212 may be similar to, or the same as, the first reservoir 153, second reservoir 143, conduit 139, first fuel level sensor 106, second fuel level sensor 109, fuel vapor pressure sensor 120, fuel vapor outlet 197, and fuel inlet 151, respectively, described above with reference to FIG. 1. A driveline of a vehicle including the fuel tank 200, such as the driveline 141 shown by FIG. 1 and described above, may be arranged between the first reservoir 202 and the second reservoir 204 along axis 230.

Referring to FIG. 3, a first graph 300 including plots showing fuel tank parameters during a refueling event of the fuel tank is shown. In one example, the fuel tank described with reference to FIG. 3 may be similar to, or the same as, the fuel tank 150 shown by FIG. 1 and described above and/or the fuel tank 200 shown by FIG. 2 and described above. The fuel tank includes a first reservoir which may be similar to, or the same as, the first reservoir 153 shown by FIG. 1 and described above and/or the first reservoir 202 shown by FIG. 2 and described above. The fuel tank additionally includes a second reservoir which may be similar to, or the same as, the second reservoir 143 shown by FIG. 1 and described above and/or the second reservoir 204 shown by FIG. 2 and described above. The graph 300 shown by FIG. 3 is a working example that presents experimental results according to a refueling control routine of the fuel tank. The refueling control routine may be similar to, or the same as, the method described further below with reference to FIG. 5.

The graph 300 includes plot 304 showing a flow rate of fuel to the fuel tank in gallons per minute (gpm), plot 302 showing a fuel vapor pressure within the fuel tank in inches of water (in-H20), and plot 306 showing an average level of fuel within the fuel tank in gallons (where the average level of fuel is an average of the level of fuel within the first reservoir and the level of fuel within the second reservoir).

As shown by plot 304, the flow rate of fuel being delivered to the fuel tank increases from 0 gpm at zero seconds to approximately 12 gpm at time t1 (e.g., shortly after initiation of the refueling event). The flow rate of fuel is maintained at approximately 12 gpm throughout the refueling event until time 4, at which the flow rate decreases to zero. The average fuel level indicated by plot 306 increases at an approximately constant rate between time t0 and time t4 due to the approximately constant flow rate of fuel to the fuel tank as described above. Following initiation of the refueling event, the fuel vapor pressure indicated by plot 302 increases as a result of fuel flowing to the first reservoir of the fuel tank. The fuel contacts interior surfaces of the first reservoir of the fuel tank and results in first pressure spike 308 at time t2 (e.g., approximately four seconds following initiation of the refueling event). The first pressure spike 308 has a magnitude of approximately 4.5 in-H20. The refueling device (e.g., similar to, or the same as, the refueling device 107 described above with reference to FIG. 1) may be configured to automatically shut off (e.g., stop refueling of the fuel tank) responsive to a fuel vapor pressure within the fuel tank greater than a threshold pressure, as described above. For example, the refueling device may include a pressure sensor (e.g., similar to, or the same as, pressure sensor 111 described above with reference to FIG. 1), and the pressure sensor may be configured to stop a flow of fuel from the refueling device responsive to the sensed pressure being greater than the threshold pressure. In some examples, the threshold pressure may be 10 in-H20. Because the first pressure spike 308 has a magnitude less than the threshold pressure, the first pressure spike 308 does not cause the refueling device to prematurely terminate the refueling event.

Following the first pressure spike 308, the fuel vapor pressure decreases and remains at approximately 3.5 in-H20 between time t2 and time t3. At time t3, the fuel vapor pressure increases and a second pressure spike 310 occurs. The second pressure spike 310 is a result of fuel overflowing from the first reservoir of the fuel tank to the second reservoir of the fuel tank. In particular, immediately prior to time t3, the fuel level within the first reservoir increases to the fuel capacity of the first reservoir and fuel flowing into the first reservoir from the fuel delivery device causes fuel to overflow from the first reservoir to the second reservoir.

As the fuel overflowing from the first reservoir to the second reservoir comes into contact with interior surfaces of the second reservoir, the amount of fuel vapor within the second reservoir increases and results in the second pressure spike 310. However, according to the refueling routine described herein, the controller commands a canister purge valve (e.g., similar to, or the same as, the canister purge valve 160 shown by FIG. 1 and described above) of the fuel system to open prior to fuel overflowing from the first reservoir to the second reservoir. As a result, the fuel vapor resulting from the overflow of fuel from the first reservoir to the second reservoir flows out of the fuel tank to the engine via the canister purge valve, which reduces the pressure of fuel vapor within the second reservoir and decreases the magnitude of the second pressure spike 310 (or eliminates the second pressure spike 310) relative to conventional routines in which the canister purge valve is not controlled to the opened position based on the fuel level within the fuel tank. As a result, the magnitude of the second pressure spike 310 is decreased sufficiently to reduce a likelihood of premature shutoff of the fuel delivery device, whereas in conventional systems the magnitude of the second pressure spike 310 is often substantially larger than the magnitude of the first pressure spike 308 (e.g., the magnitude of the first pressure spike multiplied by 1.5, the magnitude of the first pressure spike multiplied by 2, etc.) and may result in premature shutoff. For example, the threshold pressure at which the fuel delivery device automatically shuts off the flow of fuel to the fuel tank may be 10 in-H20, and opening the canister purge valve prior to overflowing fuel from the first reservoir to the second reservoir by controlling the amount of opening of the canister purge valve based on the fuel level of the fuel tank may maintain the fuel vapor pressure within the fuel tank below the threshold pressure such that fuel delivery to the fuel tank is not interrupted (e.g., prematurely terminated).

Referring to FIG. 4, another graph 400 is shown including plots illustrating fuel tank parameters during a refueling event of a fuel tank. In one example, the fuel tank described with reference to FIG. 4 may be similar to, or the same as, the fuel tank 150 shown by FIG. 1 and described above, the fuel tank 200 shown by FIG. 2 and described above, and/or the fuel tank described above with reference to FIG. 3. The fuel tank includes a first reservoir which may be similar to, or the same as, the first reservoir 153 shown by FIG. 1 and described above and/or the first reservoir 202 shown by FIG. 2 and described above. The fuel tank additionally includes a second reservoir which may be similar to, or the same as, the second reservoir 143 shown by FIG. 1 and described above and/or the second reservoir 204 shown by FIG. 2 and described above. The graph 300 shown by FIG. 3 is a working example that presents experimental results according to a refueling control routine of the fuel tank. The refueling control routine may be similar to, or the same as, the method described further below with reference to FIG. 5. The graph 400 shown by FIG. 4 is a prophetic example of a control strategy for refueling the fuel tank according to the present disclosure.

The graph 400 includes plot 401 showing a fuel flow rate from a fuel delivery device (e.g., fuel delivery device 107 described above with reference to FIG. 1) to the fuel tank (e.g., directly to the first reservoir of the fuel tank), plot 402 showing a fuel level of the first reservoir of the fuel tank, plot 404 showing a fuel level of the second reservoir of the fuel tank, plot 406 showing a fuel vapor pressure within the fuel tank (e.g., with the fuel vapor pressure within the first reservoir being equal to the fuel vapor pressure within the second reservoir), and plot 416 showing a position of a canister purge valve (which may be similar to, or the same as, the canister purge valve 160 shown by FIG. 1 and described above).

At time t0, the fuel flow rate from the fuel delivery device to the fuel tank as indicated by plot 401 begins to increase. The canister purge valve is in the fully closed position.

Between time t0 and time t1, the fuel flow rate increases and is then maintained at an approximately constant flow rate. The fuel level within the first reservoir increases from an initial fuel level at an approximately constant rate as indicated by plot 402, while the fuel level within the second reservoir does not increase and is maintained at the initial fuel level of the second reservoir as indicated by plot 404. As the fuel flowing from the fuel delivery device comes into contact with interior surfaces of the first reservoir, the fuel generates fuel vapor which increases the fuel vapor pressure within the fuel tank as indicated by plot 406. Concurrently, the canister purge valve is maintained in the fully closed position. During these conditions, a first pressure spike 408 occurs within the fuel tank. However, because the magnitude of the first pressure spike 408 is less than threshold pressure 415, the fuel delivery device does not shut off and fuel flow from the fuel delivery device to the fuel tank is not interrupted.

Between time t1 and time 2, the fuel vapor pressure indicated by plot 406 decreases following the first pressure spike 408 and remains relatively constant thereafter. The canister purge valve is maintained in the fully closed position, as indicated by plot 416. The fuel flow rate from the fuel delivery device as indicated by plot 401 is maintained at an approximately constant rate, and the fuel level within the first reservoir as indicated by plot 402 accordingly continues to increase at an approximately constant rate. However, because the fuel level within the first reservoir is less than the fuel capacity of the first reservoir, fuel does not overflow from the first reservoir to the second reservoir and the fuel level of the second reservoir remains constant as indicated by plot 404.

At time t2, the fuel level within the first reservoir as indicated by plot 402 transitions above a first threshold fuel level 418. In some examples, the first threshold fuel level may be 90% of a fuel capacity (e.g., fully filled volume) of the first reservoir of the fuel tank. In other examples, the first threshold fuel level may be 95% of the fuel capacity of the first reservoir of the fuel tank. Other examples are possible. Due to the fuel level within the first reservoir transitioning above the first threshold fuel level 418, the controller commands the canister purge valve to adjust from the fully closed position to a fully opened position at time t2. Although the canister purge valve is shown adjusting directly to the fully opened position in the example shown by FIG. 4, in some examples, the controller may command the canister purge valve to a partially opened position. The controller may further adjust the canister purge valve from the partially opened position to the fully opened position, in some examples (e.g., gradually increase the amount of opening of the canister purge valve from the fully closed position to the fully opened position). In other examples, the controller may control a duty cycle of the canister purge valve at time t2 such that the canister purge valve is adjusted between the fully closed position and the fully opened position multiple times within a given duration (e.g., the duration between time t2 and time t4). In each example, the canister purge valve is controlled such that the canister purge valve is at least partially opened in response to the fuel level of the first reservoir exceeding the threshold fuel level 418 and during a second pressure spike 410, as described below.

Between time t2 and time t3, the canister purge valve is maintained in the opened position as indicated by plot 416. The flow rate of fuel from the fuel delivery device to the first reservoir remains approximately constant, and between time t2 and time t3, the fuel level within the second reservoir does not increase. However, the fuel level within the first reservoir continues to increase and equals the fuel capacity of the first reservoir at time t3.

At time t3, fuel begins to overflow from the first reservoir to the second reservoir. As a result, between time t3 and time t4, the fuel level within the second reservoir begins to increase as indicated by plot 404. As the fuel comes into contact with interior surfaces of the second reservoir, the amount of fuel vapor within the fuel tank increases and results in the second pressure spike 410 as indicated by plot 406. For example, a temperature differential between the interior surfaces of the second reservoir and the fuel may result in a heating of the fuel as the fuel comes into contact with the interior surfaces. The increased temperature of the fuel resulting from the contact with the interior surfaces may increase a vaporization of the fuel within the fuel tank which may increase the amount of fuel vapor within the fuel tank and increase the fuel vapor pressure, resulting in the second pressure spike 410.

In conventional fuel system configurations, the second pressure spike resulting from overflow of fuel from the first reservoir to the second reservoir has a magnitude substantially greater than the first pressure spike resulting from the initial fuel flow to the first reservoir (e.g., prior to the fuel level within the first reservoir reaching the fuel capacity of the first reservoir). For example, as described above with reference to FIG. 3, the magnitude of the first pressure spike may be approximately 3.5 in-H20. However, the magnitude of the second pressure spike may be greater than 10 in-H20 in conventional fuel system configurations. For example, plot 412 illustrates an example magnitude of the second pressure spike in conventional fuel system configurations for comparison with pressure spike 410 according to the configuration of the present disclosure.

As the temperature differential between the interior surfaces of the second reservoir and the fuel increases, the magnitude of the second pressure spike increases (e.g., the magnitude of the second pressure spike may be a function of the temperature differential). During conditions in which the vehicle has been operating for an extended duration, the temperature differential may be higher relative to conditions in which the vehicle has off for an extended duration (e.g., the engine has been off and has not been igniting a mixture of fuel and air within engine cylinders). Further, as extended operation of the vehicle may increase fuel consumption of the vehicle, the temperature differential may often be relatively high during refueling events (e.g., due to the increased fuel consumption resulting in shorter spans of time between refueling events). However, the configuration according to the present disclosure may reduce and/or eliminate the second pressure spike 410. In particular, the magnitude of the second pressure spike 410 in the configuration of the present disclosure may be substantially less than the magnitude of the second pressure spike in conventional configurations (indicated by plot 412).

Because the canister purge valve is open at time t3 when fuel begins to overflow from the first reservoir to the second reservoir, the increased fuel vapor within the fuel tank resulting from the overflow of fuel to the second reservoir flows out of the fuel tank to the engine via the canister purge valve. As a result, the fuel vapor pressure within the fuel tank is reduced at the second pressure spike 410 relative to conventional systems that do not control amount of opening of the canister purge valve based on the fuel levels of the fuel tank (e.g., with the second pressure spike generated in conventional systems indicated by plot 412). The reduction in fuel vapor pressure provided by the configuration of the present disclosure reduces a likelihood of premature shutoff of the fuel delivery device. In particular, because the magnitude of the second pressure spike 410 is much less than threshold pressure 415, where threshold pressure 415 is a pressure at which the fuel delivery device automatically shuts off and stops fuel delivery to the fuel tank, the configuration according to the present disclosure reduces the likelihood of premature shutoff of the fuel delivery device. The reduction of the magnitude of the second pressure spike 410 may be sufficient to reduce the likelihood of premature shutoff for a large variety of fuel delivery devices (e.g., fuel delivery devices configured to deliver fuel for use by the engine of the vehicle). For example, fuel delivery devices configured may typically have a pressure threshold for automatic shutoff within a range of 9.5 in-H20 to 10.5 in-H20. Because the magnitude of the second pressure spike 410 is reduced far below the pressure threshold range (e.g., the magnitude of the second pressure spike 410 may be approximately 6 in-H20), the likelihood of premature termination of the refueling of the fuel tank may be greatly reduced.

In some examples, as described below with reference to FIG. 5, the controller may adjust the amount of opening of the canister purge valve based on the temperature differential between the fuel tank and the fuel. For example, the controller may measure and/or estimate a temperature of the fuel based on an output of one or more temperature sensors (e.g., the controller may estimate the temperature of the fuel based on an output of an ambient air temperature sensor of the vehicle, such as temperature sensor 199 shown by FIG. 1), and the controller may measure and/or estimate the temperature of the fuel tank based on an output of a fuel tank temperature sensor (e.g., temperature sensor 157 and/or temperature sensor 159 shown by FIG. 1), an output of an engine temperature sensor (e.g., temperature sensor 165 shown by FIG. 1), and/or an operating duration of the vehicle (e.g., with the estimated fuel tank temperature being a function of the operating duration of the engine, where longer operating durations may result in increased fuel tank temperatures). Adjusting the amount of opening of the canister purge valve based on the temperature differential may include increasing the amount of opening (e.g., increasing a duration in which the canister purge valve is opened, advancing the opening of the canister purge valve, increasing a duty cycle of the canister purge valve, etc.) during conditions in which the temperature differential is higher and/or decreasing the amount of opening during conditions in which the temperature differential is lower (e.g., decreasing a duration in which the canister purge valve is opened, retarding the opening of the canister purge valve, decreasing a duty cycle of the canister purge valve, etc. relative to conditions in which the temperature differential is higher).

Further, in some examples, controlling the amount of opening of the canister purge valve may be based at least in part on the flow rate of fuel to the fuel tank from the fuel delivery device. For example, the controller may continuously monitor the level of fuel within the fuel tank (e.g., the fuel level within the first reservoir and the fuel level within the second reservoir) and may determine the flow rate of fuel to the fuel tank based on a rate of change of the fuel level of the fuel tank. As one example, the controller may compare the fuel level within the first reservoir at time t0 to the fuel level within the first reservoir at time t1 and may determine (e.g., estimate, calculate, etc.) the flow rate of fuel to the fuel tank based on the difference between the fuel level at time t0 and the fuel level at time t1. The controller may use the determined flow rate of fuel in order to adjust the amount of opening of the canister purge valve prior to the second pressure spike. For example, the controller may advance and/or retard the opening of the canister purge valve based on the flow rate of the fuel. As another example, the controller may control the duty cycle of the canister purge valve based on the flow rate of the fuel, where the duty cycle may be increased by a higher amount (e.g., to 100% of a full duty cycle of the canister purge valve) for higher flow rates and increased by a lower amount (e.g., to 50% of the full duty cycle of the canister purge valve) for lower flow rates responsive to the fuel level within the first reservoir transitioning above the first threshold fuel level.

In some examples, controlling the amount of opening of the canister purge valve may be based at least in part on a volatility of the fuel flowing to the fuel tank. For example, the engine of the vehicle may be configured to operate by combusting a mixture of air and fuel within engine cylinders, where the fuel has a pre-determined fuel volatility. As one example, the engine may be a gasoline engine configured to combust gasoline having an octane rating of 93, and the amount of opening of the canister purge valve (e.g., a timing of the opening) may be based at least in part on the volatility (e.g., vaporization rate) of the gasoline. As another example, the engine may be a gasoline engine configured to combust gasoline having a range of octane ratings (e.g., 87-93), and the amount of opening of the canister purge valve may be based on an average vaporization rate of the fuels within the range. As yet another example, the engine may be configured to combust 1-D diesel fuel, and the amount of opening of the canister purge valve may be based at least in part on the volatility (e.g., vaporization rate) of the 1-D diesel fuel. As yet another example, the engine may be configured to combust 2-D diesel fuel, and the amount of opening of the canister purge valve may be based at least in part on the volatility of the 2-D diesel fuel. Other examples are possible.

Between time t3 and time t4, the fuel vapor pressure within the fuel tank peaks at the second pressure spike 410 and then decreases as the fuel vapor flows out of the fuel tank to the engine via the canister purge valve (e.g., due to the controller modulating the amount of opening of the canister purge valve and maintaining the canister purge valve in at least a partially opened position for at least a duration between time t3 and time t4). Because the fuel level of the first reservoir is at the fuel capacity of the first reservoir at time t3 (e.g., the first reservoir is full with fuel at time t3), as fuel flows to the first reservoir between time t3 and t4 (e.g., as indicated by the approximately constant fuel flow rate from the fuel delivery device to the first reservoir as indicated by plot 401), fuel overflows from the first reservoir to the second reservoir between time t3 and time t4. As a result, the fuel level of the second reservoir increases between time t3 and time t4, as indicated by plot 404.

At time t4, the fuel level of the second reservoir transitions above threshold fuel level 420. As a result, the controller adjusts the canister purge valve to the fully closed position. In some examples, the threshold fuel level 420 may be a percentage volume of the full fuel capacity of the second reservoir (e.g., 5% of the full fuel capacity, 10% of the full fuel capacity, etc.). The transition of the fuel level of the second reservoir above the threshold fuel level 420 is one example of a closing condition of the canister purge valve. The controller is configured to close the canister purge valve following the second pressure spike 410 responsive to a determination that a closing condition has occurred. As one example, the controller may adjust the canister purge valve to the fully closed position responsive to an elapsed pre-determined duration immediately following the second pressure spike 410 (e.g., the controller may continuously monitor the fuel level of the second reservoir as described above, and immediately following a sensed change in the fuel level of the second reservoir due to the overflow of fuel from the first reservoir to the second reservoir, the controller may wait a pre-determined duration before adjusting the canister purge valve to the fully closed position). In some examples, the controller may increase or decrease the pre-determined duration based on the flow rate of fuel to the fuel tank (indicated by plot 401) in order to provide a pre-determined amount of fuel to the second reservoir prior to adjusting the canister purge valve to the fully closed position. For example, in order to provide the pre-determined amount of fuel, the controller may determine the flow rate of fuel from the fuel delivery device to the fuel tank and may calculate the amount of time (e.g., duration) to continue flowing fuel to the fuel tank at the determined flow rate. As one example, fuel may flow to the fuel tank from the fuel delivery device at a flow rate of 12 gallons per minute. In order to provide one gallon of fuel (as one non-limiting example of a pre-determined fuel amount) to the second reservoir prior to adjusting the canister purge valve to the fully closed position, the controller may maintain the canister purge valve in the opened position for five seconds (e.g., 1/12 of one minute) following the sensed change in the fuel level of the second reservoir while fuel flows from the fuel delivery device to the fuel tank at 12 gallons per minute. As another example, in order to provide the pre-determined amount of fuel to the second reservoir during conditions in which the pre-determined amount of fuel is two gallons, the controller may maintain the canister purge valve in the opened position for 10 seconds following the sensed change in the fuel level of the second reservoir while fuel flows from the fuel delivery device to the fuel tank at 12 gallons per minute. The pre-determined amount of fuel may be based on a temperature of the fuel tank, a temperature of the fuel, and/or fuel volatility in some examples, as described below.

Between time t4 and time t5, the flow rate of fuel to the fuel tank from the fuel delivery device remains approximately constant. Because the fuel overflows from the first reservoir to the second reservoir, the fuel level within the second reservoir increases at an approximately constant rate between time t4 and time t5 while the fuel level within the first reservoir is maintained at the full fuel capacity of the first reservoir. The canister purge valve, adjusted to the fully closed position at time t4, is maintained in the fully closed position between time t4 and time t5. The fuel vapor pressure decreases following the peak of the second pressure spike 410 and increases gradually between time t4 and t5.

At time t5, the fuel vapor pressure indicated by plot 406 increases above threshold pressure 415. As a result, the flow of fuel from fuel delivery device decreases between time t5 and t6 and is terminated at time t6 as indicated by plot 401. For example, the fuel delivery device may include a pressure sensor (e.g., similar to the examples described above), and the pressure sensor may sense (e.g., measure) the fuel vapor pressure indicated by plot 406 continuously throughout the refueling event. The pressure sensor may be configured to automatically shut off the fuel flow from the fuel delivery device responsive to the fuel vapor pressure being above the threshold pressure 415.

Between time t5 and time t6, the flow rate of fuel from the fuel delivery device decreases until the flow of fuel from the fuel delivery device stops (e.g., the fuel flow is terminated), as indicated by plot 401. The fuel level of the second reservoir increases to the full fuel capacity of the second reservoir and is maintained at the full fuel capacity after time t6, as indicated by plot 404. The fuel vapor pressure within the fuel tank decreases after time t6 as indicated at 414, and the canister purge valve is maintained in the closed position until commanded by the controller to open (e.g., during the next refueling event, during engine operation, etc.).

Referring to FIG. 5, a flowchart illustrating a method 500 for controlling fuel vapor flow during a refueling event of a fuel tank is shown. Control of the fuel system as described above with reference to FIG. 4 may be according to the method 500 described below. Instructions for carrying out method 500 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The sensors, actuators, and other components described below with reference to method 500 may be similar to, or the same as, those described above. For example, the fuel tank, first reservoir, second reservoir, first fuel level sensor, second fuel level sensor, fuel delivery device, canister purge valve, and engine may be similar to, or the same as, fuel tank 150, first reservoir 153, second reservoir 143, first fuel level sensor 106, second fuel level sensor 109, fuel dispensing device 107, canister purge valve 160, and engine 113, respectively, described above with reference to FIG. 1.

At 502, the method includes estimating and/or measuring fuel system conditions. For example, estimating and/or measuring fuel system conditions may include measuring a pressure of fuel vapor within the fuel tank (e.g., via a pressure sensor such as pressure sensor 120 shown by FIG. 1 and described above), a temperature of the fuel tank (e.g., via one or more temperature sensors such as temperature sensor 157 and/or temperature sensor 159 shown by FIG. 1), atmospheric air temperature, etc. The controller may estimate a temperature of fuel prior to delivery of the fuel to the fuel tank based on the atmospheric air temperature, as one example (e.g., the controller may estimate that the temperature of fuel provided to the fuel tank may be approximately the same as the atmospheric air temperature, less than the atmospheric air temperature by a value stored in a lookup table in a memory of the controller, etc.). Estimating and/or measuring fuel system conditions may include, at 504, measuring an output of the first fuel level sensor arranged at the first reservoir of a fuel tank and an output of the second fuel level sensor arranged at the second reservoir of the fuel tank.

The method continues at 506 where the method includes flowing fuel to the first reservoir of the fuel tank until the monitored fuel level is greater than a first threshold fuel level while concurrently maintaining the canister purge valve in the closed position and monitoring the fuel level of the first reservoir. For example, as shown by plot 402 of graph 400 of FIG. 4, the fuel level of the first reservoir increases toward the first threshold fuel level (e.g., threshold fuel level 418 shown by FIG. 4 and described above) as fuel flows to the first reservoir via a fuel delivery device (e.g., similar to, or the same as, fuel delivery device 107 described above with reference to FIG. 1). While the fuel flows to the first reservoir, the controller (e.g., similar to, or the same as, controller 112 described above with reference to FIG. 1) continuously (e.g., without stopping, without interruption, etc.) monitors (e.g., senses, measures, etc.) the fuel level within the first reservoir. Concurrently, the canister purge valve is maintained in the fully closed position as the fuel level within the first reservoir approaches the first threshold fuel level. In some examples the first threshold fuel level may be based on a full fuel capacity of the first reservoir, as described above (e.g., the threshold fuel level may be 95% of the full fuel capacity of the first reservoir). It should be noted that fuel flows continuously from the fuel delivery device, without interruption, as the fuel level within the first reservoir transitions from below the first threshold fuel level to above the threshold fuel level (as described below).

Similar to the example described above with reference to FIG. 1, the fuel system may include a fuel tank isolation valve (FTIV). The FTIV may be similar to, or the same as, the FTIV 110 described above. The FTIV may be opened by the controller prior to flowing fuel to the first reservoir and may be maintained in the opened position while fuel flows to the first reservoir. In particular, during conditions in which the fuel level within the first reservoir is less than the first threshold fuel level and fuel flows to the first reservoir, the FTIV may be maintained in the opened position while the canister purge valve is maintained in the fully closed position. The FTIV may be maintained in the opened position while the canister purge valve is maintained in the fully closed position until the fuel level within the first reservoir transitions above the first threshold fuel level, and responsive to the fuel level transitioning above the first threshold fuel level, the controller may open the canister purge valve as described below.

The method continues at 508 where the method includes opening the canister purge valve while controlling the amount of opening based on the monitored fuel level of the first reservoir. In particular, when the fuel level within the first reservoir transitions above the first threshold fuel level, the controller commands the canister purge valve to an opened position and controls the amount of opening based on the monitored fuel level. As one example, controlling the amount of opening based on the monitored fuel level may include controlling a duty cycle of the canister purge valve based on a rate of change of the monitored fuel level. For example, the controller may determine an initial fuel level of the first reservoir at initiation of the refueling event (e.g., during the estimating and/or measuring of fuel system conditions at 502) and may determine a difference between the initial fuel level and the first threshold fuel level.

During refueling of the fuel tank, the controller may determine (e.g., calculate) the rate of change of the monitored fuel level based on an amount of time (e.g., a duration) to increase the fuel level within the first reservoir from the initial fuel level to the threshold fuel level. The controller may control the amount of opening of the canister purge valve based on the rate of change. As an example, the controller may increase a size of the opening (e.g., an open diameter) of the canister purge valve at 508 by a higher, first amount responsive to conditions in which the rate of change of the fuel level within the first reservoir is higher, and the controller may increase the size of the opening of the canister purge valve at 508 by a lower, second amount responsive to conditions in which the rate of change of the fuel level within the first reservoir is lower. As another example, at 510, the controller may adjust a duty cycle of the canister purge valve based on the rate of change of the monitored fuel level of the fuel tank. For example, the controller may increase the duty cycle of the canister purge valve at 508 by a higher, first amount responsive to conditions in which the rate of change of the fuel level within the first reservoir is higher, and the controller may increase the duty cycle of the canister purge valve at 508 by a lower, second amount responsive to conditions in which the rate of change of the fuel level within the first reservoir is lower (e.g., the duty cycle may be a function of the rate of change of the fuel level within the first reservoir). As one example, the duty cycle may be proportional to the rate of change of the fuel level within the first reservoir.

The method continues at 512 where the method includes flowing fuel vapor from the fuel tank and store the fuel vapor within a second fuel vapor canister at the intake of the engine. The second fuel vapor canister may be similar to, or the same as, the second fuel vapor canister 119 described above with reference to FIG. 1. While the canister purge valve is opened, fuel vapor within the fuel tank may flow from the fuel tank to the engine via the canister purge valve and may be adsorbed within the second fuel vapor canister arranged at the intake of the engine.

In some examples the vehicle may be configured as a hybrid-electric vehicle including the engine and an electric machine configured to provide torque to wheels of the vehicle. During conditions in which the vehicle has been driven for a duration without operating the engine (e.g., the vehicle has been driven via the electric machine without torque being provided to the wheels by the engine) and fuel vapor is stored within the second fuel vapor canister, the controller may be configured to transition the engine from the off condition (e.g., the condition in which the engine is not operating and not combusting a mixture of fuel and air) to the on condition (e.g., the condition in which the engine is operating and combusting a mixture of fuel and air within engine cylinders) prior to a refueling event in order to combust the vapor stored within the second fuel vapor canister within the engine cylinders. In some examples, following a refueling event, the controller may transition the engine from the off condition to the on condition for a duration sufficient to combust vapor from the second fuel vapor canister within the engine cylinders. Once the fuel vapor has been combusted, the controller may maintain the engine in the on condition or may transition the engine to the off condition while maintaining a torque output to wheels of the vehicle via the electric machine (e.g., satisfying a torque demand via the electric machine, without contribution from the engine).

In some examples, the engine may be pre-positioned prior to shutdown of the engine if the controller determines that a refueling event may occur while the engine is in the off condition. For example, during a transition of the engine to the off condition, the controller may control the engine to adjust pistons within the engine cylinders to a pre-determined position to increase a likelihood of combustion of fuel vapor within the engine cylinders at the next engine-on condition and reduce a likelihood of undesired flow of fuel vapor to atmosphere. For example, the controller may control the position of the pistons to increase a volume within the engine cylinders for combustion of fuel vapor.

The method continues at 514 where the method includes overflowing fuel from the first reservoir to a second reservoir of the fuel tank while concurrently monitoring a fuel level of the second reservoir until a closing condition is satisfied. For example, as described above with reference to FIG. 4, fuel may flow continuously from the fuel delivery device to the first reservoir while the fuel level within the first reservoir transitions from below the threshold fuel level to above the threshold fuel level (e.g., as described at 506). Fuel continues to flow through the fuel delivery device to the first reservoir, with the fuel level within the first reservoir becoming equal to the full fuel capacity of the first reservoir. As fuel continues to flow to the first reservoir while the fuel level within the first reservoir is equal to the full fuel capacity of the first reservoir, fuel overflows from the first reservoir to the second reservoir. The controller continuously monitors (e.g., measures) the fuel level within the second reservoir and may determine a rate of change of the fuel level of the second reservoir (which may be referred to herein as a fuel overflow rate from the first reservoir) based on a difference between an initial fuel level of the second reservoir and the monitored fuel level of the second reservoir. For example, as described above at 504, the controller may estimate and/or measure the initial fuel level of the second reservoir at initiation of the refueling event (e.g., during coupling of the fuel delivery device to a fuel inlet of the fuel tank, such as fuel inlet 151 shown by FIG. 1 and described above, where the controller may sense the coupling of the fuel delivery device to the fuel inlet via a measured change to the fuel vapor pressure resulting from insertion of the fuel delivery device into the fuel inlet, a motion sensor, etc.), and the controller may calculate the rate of change of the fuel level of the second reservoir by comparing the initial fuel level with the monitored fuel level.

In one example, the closing condition may be a determination that a sufficient amount of fuel has overflowed from the first reservoir to the second reservoir. For example, the controller may calculate a difference between the initial amount of fuel in the second reservoir and the monitored amount in order to determine the amount of fuel that has been added to the second reservoir via overflow from the first reservoir, and the controller may determine whether the difference (e.g., the amount of fuel added) is greater than a threshold difference (e.g., a threshold amount of fuel added). The controller may determine whether the amount of fuel added is sufficient to reduce the temperature differential between the fuel and the interior surfaces of the second reservoir below a threshold differential, in some examples. For example, the controller may calculate the temperature differential between the fuel and the interior surfaces of the second reservoir by calculating a difference between the estimated fuel temperature and the estimated and/or measured (e.g., sensed) temperature of the second reservoir. As described above, during conditions in which the temperature differential is higher, an amount of fuel vapor resulting from the overflow of fuel from the first reservoir to the second reservoir may be increased as the fuel comes into contact with interior surfaces of the second reservoir.

In order to reduce vapor accumulation within the fuel tank and reduce a likelihood and/or magnitude of pressure spikes within the fuel tank, the controller may maintain the canister purge valve in the opened position until the closing condition is satisfied (e.g., a sufficient amount of fuel has overflowed from the first reservoir to the second reservoir based on the temperature differential). For example, during conditions in which the temperature differential is higher, the controller may maintain the canister purge valve in the opened position for a longer duration (e.g., 15 seconds following initiation of the fuel overflow to the second reservoir) to ensure a larger amount of fuel overflows to the second reservoir prior to closure of the canister purge valve, where the closing condition is the end of the longer duration following initiation of the fuel overflow to the second reservoir. During conditions in which the temperature differential is lower, the controller may maintain the canister purge valve in the opened position for a shorter duration (e.g., 10 seconds following initiation of the fuel overflow to the second reservoir), where the closing condition is the end of the shorter duration following initiation of the fuel overflow to the second reservoir. In another example, the closing condition may be a determination that the temperature of the second reservoir has decreased by a pre-determined amount based on an initial temperature of the second reservoir at the start of the refueling event. For example, the closing condition may be a determination that the temperature of the second reservoir has decreased by 2 degrees Fahrenheit, 4 degrees Fahrenheit, etc. relative to the initial temperature of the second reservoir.

In another example, the closing condition may be a determination that a pre-determined amount of time has elapsed following a detected (e.g., sensed, measured, calculated, etc.) non-zero rate of change of the fuel level of the second reservoir. The pre-determined amount of time may be based on a volatility of the fuel, in some examples. For example, as described above, the engine of the vehicle may be configured to operate by combusting a mixture of air and fuel within engine cylinders, where the fuel has a pre-determined volatility. As one example, the engine may be a gasoline engine configured to combust gasoline having an octane rating of 93, and the pre-determined amount of time (e.g., duration) following the detected non-zero rate of change of the fuel level of the second reservoir may be based at least in part on the volatility (e.g., vaporization rate) of the gasoline (e.g., the pre-determined amount of time may be higher for fuels having a higher volatility and may be lower for fuels having a lower volatility).

In some examples, the duration in which the canister purge valve is maintained in the opened position following the determination (e.g., detection) of the non-zero rate of change of the fuel level of the second reservoir may be based at least in part on the previously determined rate of change of the fuel level of the first reservoir. For example, as described above, the controller may calculate the rate of change of the fuel level of the first reservoir based on the initial fuel level of the first reservoir compared to the monitored fuel level of the first reservoir. The duration in which the canister purge valve is maintained in the opened position may be shorter during conditions in which the controller determines that the rate of change of the fuel level of the first reservoir is higher, and the duration may be higher during conditions in which the controller determines that the rate of change of the fuel level of the first reservoir is lower (e.g., the duration in which the canister purge valve is maintained in the opened position may be a function of the determined rate of change of the fuel level of the first reservoir).

The method continues at 516 where the method includes closing the canister purge valve. In particular, following the determination that the closing condition has occurred, the controller adjusts the canister purge valve to the fully closed position. Adjusting the canister purge valve to the fully closed position may include decreasing the duty cycle of the canister purge valve (e.g., decreasing the duty cycle from 100% to 0%, gradually or directly), decreasing the size (e.g., diameter) of the opening of the canister purge valve, etc. In some examples, at 518, the duty cycle of the canister purge valve may be based on the rate of overflow of fuel from the first reservoir to the second reservoir. For example, during conditions in which the rate of overflow is higher, the duty cycle may be decreased more quickly until the canister purge valve is maintained in the fully closed position, and during conditions in which the rate of overflow is lower, the duty cycle may be decreased less quickly until the canister purge valve is maintained in the fully closed position (e.g., the decreasing of the duty cycle of the canister purge valve may be inversely proportional to the rate of overflow of fuel from the first reservoir to the second reservoir).

Following the refueling event and during operation of the engine, the fuel vapor stored within the second fuel vapor canister may flow to cylinders of the engine and may be ignited within the cylinders. In this configuration, a likelihood of fuel vapor flowing directly to atmosphere is reduced, and an emissions quality of the vehicle may be increased.

It is noted that although the control routines described above describe estimates and/or measurements in determining fuel vapor pressure, the routines may be performed without the controller determining the fuel vapor pressure. In particular, controlling operation of the canister purge valve during refueling of the fuel tank as described above may reduce fuel vapor accumulation and fuel vapor pressure spikes within the fuel tank, but control of the canister purge valve is not reliant upon the estimation and/or measurement of the fuel vapor pressure. For example, the routines described above may be performed by a controller for fuel systems that do not include a fuel vapor pressure sensor, as the controller controls operation of the canister purge valve based on the fuel levels within the fuel tank in anticipation of the effect of the fuel levels on the fuel vapor pressure (e.g., as a prophetic control routine) and not based on measured fuel vapor pressure. By controlling the operation of the canister purge valve based on the fuel levels, the likelihood and/or magnitude of fuel vapor pressure spikes may be reduced even in systems that do not include fuel vapor pressure sensors. Further, by controlling the operating of the canister purge valve based on the fuel levels, pressure spikes may be alleviated by opening the canister purge valve before pressure spikes occur. For example, the canister purge valve may be controlled based on the fuel levels to prevent pressure spikes from occurring even during conditions in which the fuel vapor pressure has not yet increased (e.g., the controller may predict a fuel vapor pressure increase, or pressure spike, based on the fuel levels and not on a measured fuel vapor pressure and may accordingly open the canister purge valve to reduce the likelihood and/or magnitude of the predicted fuel vapor pressure increase or pressure spike). As a result, an ease of refueling may be increased and a cost of the fuel system may be reduced.

In this way, by controlling operation of the canister purge valve during refueling events, the canister purge valve may be opened in order to reduce the likelihood and/or magnitude of fuel vapor pressure spikes and may reduce a likelihood of premature termination of the refueling of the fuel tank. In particular, controlling the canister purge valve during refueling events as described above may reduce a likelihood of premature fuel nozzle shutoff responsive to fuel overflow from the first reservoir to the second reservoir in saddle fuel tanks.

The technical effect of opening the canister purge valve during refueling of the fuel tank is to flow fuel vapor from the fuel tank to the engine and decrease the pressure of fuel vapor within the fuel tank.

FIG. 2 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figure, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figure relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The disclosure also provides support for a method for a fuel system, comprising: during a refueling event: opening a canister purge valve fluidly coupling a fuel vapor canister to an intake of an engine responsive to a fuel level of a fuel tank transitioning above a first threshold fuel level, and closing the canister purge valve after flowing a pre-determined amount of fuel to the fuel tank while the canister purge valve is open. In a first example of the method, the method further comprises: determining the fuel level via one or more fuel level sensors. In a second example of the method, optionally including the first example, determining the fuel level via the one or more fuel level sensors includes measuring an output of a first fuel level sensor arranged at a first reservoir of the fuel tank. In a third example of the method, optionally including one or both of the first and second examples, flowing the pre-determined amount of fuel to the fuel tank includes: increasing the fuel level above the first threshold fuel level to a second threshold fuel level, and maintaining the fuel level at the second threshold fuel level while overflowing fuel from the first reservoir to a second reservoir. In a fourth example of the method, optionally including one or more or each of the first through third examples, the pre-determined amount of fuel is based on at least one of fuel tank temperature, fuel flow rate, or fuel volatility. In a fifth example of the method, optionally including one or more or each of the first through fourth examples, opening the canister purge valve includes adjusting a duty cycle of the canister purge valve based on a rate of change of the fuel level of the fuel tank. In a sixth example of the method, optionally including one or more or each of the first through fifth examples, the duty cycle is proportionate to the rate of change of the fuel level of the fuel tank. In a seventh example of the method, optionally including one or more or each of the first through sixth examples, closing the canister purge valve includes decreasing a duty cycle of the canister purge valve based on a rate of overflow of fuel from a first reservoir of the fuel tank to a second reservoir of the fuel tank. In a eighth example of the method, optionally including one or more or each of the first through seventh examples, the decreasing of the duty cycle of the canister purge valve is inversely proportional to the rate of overflow of fuel from the first reservoir to the second reservoir. In a ninth example of the method, optionally including one or more or each of the first through eighth examples, the method further comprises:, while the canister purge valve is open, flowing fuel vapor from the fuel tank and storing the fuel vapor within a second fuel vapor canister at the intake of the engine. In a tenth example of the method, optionally including one or more or each of the first through ninth examples, the method further comprises:, following the refueling event and during operation of the engine, flowing the fuel vapor stored within the second fuel vapor canister to cylinders of the engine and igniting the fuel vapor within the cylinders.

The disclosure also provides support for a method for a fuel system, comprising: during a refueling event: flowing fuel to a first reservoir of a fuel tank while concurrently monitoring a fuel level of the first reservoir, overflowing fuel from the first reservoir to a second reservoir of the fuel tank while concurrently monitoring a fuel level of the second reservoir, and controlling an amount of opening of a canister purge valve based on the monitored fuel level of the first reservoir and/or the monitored fuel level of the second reservoir. In a first example of the method, controlling the amount of opening of the canister purge valve based on the monitored fuel level of the first reservoir includes adjusting the canister purge valve from a fully closed position to an opened position responsive to the monitored fuel level of the first reservoir transitioning above a threshold fuel level. In a second example of the method, optionally including the first example, the threshold fuel level is less than a full fuel capacity of the first reservoir. In a third example of the method, optionally including one or both of the first and second examples, controlling the amount of opening of the canister purge valve based on the monitored fuel level of the second reservoir includes: determining an initial fuel level of the second reservoir prior to overflowing fuel from the first reservoir to the second reservoir, determining a difference between the monitored fuel level of the second reservoir and the initial fuel level, and decreasing the amount of opening of the canister purge valve based on the difference. In a fourth example of the method, optionally including one or more or each of the first through third examples, decreasing the amount of opening of the canister purge valve based on the difference between the monitored fuel level of the second reservoir and the initial fuel level includes adjusting the canister purge valve to a fully closed position responsive to the difference being greater than a threshold difference.

The disclosure also provides support for a system, comprising: an engine, a fuel tank including a first reservoir and a second reservoir, a fuel vapor canister fluidly coupled to the fuel tank, a canister purge valve arranged along a fuel vapor flow path between the fuel vapor canister and the engine, and a controller with computer readable instructions stored on non-transitory memory that when executed during an engine-off condition, cause the controller to: open the canister purge valve responsive to a fuel level of the first reservoir of the fuel tank transitioning above a first threshold fuel level during a refueling event, and close the canister purge valve responsive to an overflow of fuel from the first reservoir to the second reservoir being greater than a threshold overflow. In a first example of the system, the system further comprises: a driveshaft of the engine arranged between the first reservoir and the second reservoir, a fuel pump fluidly coupling the first reservoir to the engine, a jet pump fluidly coupling the second reservoir to the first reservoir, a first fuel level sensor disposed within the first reservoir, and a second fuel level sensor disposed within the second reservoir. In a second example of the system, optionally including the first example, the controller further includes computer readable instructions stored on non-transitory memory that when executed during an engine-off condition, cause the controller to: adjust a duty cycle of the canister purge valve responsive to the overflow of fuel from the first reservoir to the second reservoir based on at least one of fuel temperature, fuel overflow rate, or fuel volatility. In a third example of the system, optionally including one or both of the first and second examples, the controller further includes computer readable instructions stored on non-transitory memory that when executed during an engine-off condition, cause the controller to: adjust the threshold overflow based on flow rate of fuel to the first reservoir during the refueling event./

In another representation, a vehicle comprises: an engine; an electric machine selectably driven by the engine and configured to provide torque output to wheels of the vehicle; a fuel tank including a first reservoir and a second reservoir; a fuel vapor canister fluidly coupled to the fuel tank; a canister purge valve arranged along a fuel vapor flow path between the fuel vapor canister and the engine; and a controller with computer readable instructions stored on non-transitory memory that when executed during an engine-off condition, cause the controller to: open the canister purge valve responsive to a fuel level of the first reservoir of the fuel tank transitioning above a first threshold fuel level during a refueling event; and close the canister purge valve responsive to an overflow of fuel from the first reservoir to the second reservoir being greater than a threshold overflow.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
during a refueling event:
opening a canister purge valve fluidly coupling a fuel vapor canister to an intake of an engine responsive to a fuel level of a fuel tank transitioning above a first threshold fuel level; and
closing the canister purge valve after flowing a pre-determined amount of fuel to the fuel tank while the canister purge valve is open, wherein the pre-determined amount of fuel is based on at least one of fuel tank temperature, fuel flow rate, or fuel volatility.

2. The method of claim 1, further comprising determining the fuel level via one or more fuel level sensors.

3. The method of claim 2, wherein determining the fuel level via the one or more fuel level sensors includes measuring an output of a first fuel level sensor arranged at a first reservoir of the fuel tank.

4. The method of claim 1, wherein flowing the pre-determined amount of fuel to the fuel tank includes:
increasing the fuel level above the first threshold fuel level; and
maintaining the fuel level above the first threshold fuel level while overflowing fuel from a first reservoir of the fuel tank to a second reservoir of the fuel tank.

5. The method of claim 1, wherein opening the canister purge valve includes adjusting a duty cycle of the canister purge valve based on a rate of change of the fuel level of the fuel tank.

6. The method of claim 5, wherein the duty cycle is proportionate to the rate of change of the fuel level of the fuel tank.

7. A method for a fuel system, comprising:
during a refueling event:
opening a canister purge valve fluidly coupling a fuel vapor canister to an intake of an engine responsive to a fuel level of a fuel tank transitioning above a first threshold fuel level; and
closing the canister purge valve after flowing a pre-determined amount of fuel to the fuel tank while the canister purge valve is open, wherein closing the canister purge valve includes decreasing a duty cycle of the canister purge valve based on a rate of overflow of fuel from a first reservoir of the fuel tank to a second reservoir of the fuel tank.

8. The method of claim 7, wherein the decreasing of the duty cycle of the canister purge valve is inversely proportional to the rate of overflow of fuel from the first reservoir to the second reservoir.

9. The method of claim 1, further comprising, while the canister purge valve is open, flowing fuel vapor from the fuel tank and storing the fuel vapor within a second fuel vapor canister at the intake of the engine.

10. The method of claim 9, further comprising, following the refueling event and during operation of the engine, flowing the fuel vapor stored within the second fuel vapor canister to cylinders of the engine and igniting the fuel vapor within the cylinders.

11. A method for a fuel system, comprising:
during a refueling event:
flowing fuel to a first reservoir of a fuel tank while concurrently monitoring a fuel level of the first reservoir;
overflowing fuel from the first reservoir to a second reservoir of the fuel tank while concurrently monitoring a fuel level of the second reservoir; and
controlling an amount of opening of a canister purge valve based on the monitored fuel level of the first reservoir and/or the monitored fuel level of the second reservoir.

12. The method of claim 11, wherein controlling the amount of opening of the canister purge valve based on the monitored fuel level of the first reservoir includes adjusting the canister purge valve from a fully closed position to an opened position responsive to the monitored fuel level of the first reservoir transitioning above a threshold fuel level.

13. The method of claim 12, wherein the threshold fuel level is less than a full fuel capacity of the first reservoir.

14. The method of claim 11, wherein controlling the amount of opening of the canister purge valve based on the monitored fuel level of the second reservoir includes:
determining an initial fuel level of the second reservoir prior to overflowing fuel from the first reservoir to the second reservoir;
determining a difference between the monitored fuel level of the second reservoir and the initial fuel level; and
decreasing the amount of opening of the canister purge valve based on the difference.

15. The method of claim 14, wherein decreasing the amount of opening of the canister purge valve based on the difference between the monitored fuel level of the second reservoir and the initial fuel level includes adjusting the canister purge valve to a fully closed position responsive to the difference being greater than a threshold difference.

16. A system, comprising:
an engine;

a fuel tank including a first reservoir and a second reservoir;

a fuel vapor canister fluidly coupled to the fuel tank;

a canister purge valve arranged along a fuel vapor flow path between the fuel vapor canister and the engine; and a controller with computer readable instructions stored on non-transitory memory that when executed during an engine-off condition, cause the controller to:

open the canister purge valve responsive to a fuel level of the first reservoir of the fuel tank transitioning above a first threshold fuel level during a refueling event; and close the canister purge valve responsive to an overflow of fuel from the first reservoir to the second reservoir being greater than a threshold overflow.

17. The system of claim 16, further comprising:

a driveshaft of the engine arranged between the first reservoir and the second reservoir;

a fuel pump fluidly coupling the first reservoir to the engine;

a jet pump fluidly coupling the second reservoir to the first reservoir;

a first fuel level sensor disposed within the first reservoir; and a second fuel level sensor disposed within the second reservoir.

18. The system of claim 16, wherein the controller further includes computer readable instructions stored on non-transitory memory that when executed during the engine-off condition, cause the controller to:

adjust a duty cycle of the canister purge valve responsive to the overflow of fuel from the first reservoir to the second reservoir based on at least one of fuel temperature, fuel overflow rate, or fuel volatility.

19. The system of claim 16, wherein the controller further includes computer readable instructions stored on non-transitory memory that when executed during the engine-off condition, cause the controller to:

adjust the threshold overflow based on flow rate of fuel to the first reservoir during the refueling event.

\* \* \* \* \*